(12) United States Patent
Tashiro et al.

(10) Patent No.: US 10,447,911 B2
(45) Date of Patent: Oct. 15, 2019

(54) INFORMATION PROCESSING APPARATUS, NETWORK CAMERA AND PROCESSING SYSTEM

(71) Applicant: CANON KABUSHIKI KAISHA, Tokyo (JP)

(72) Inventors: Masanori Tashiro, Funabashi (JP); Motoo Ohnishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/422,869

(22) Filed: Feb. 2, 2017

(65) Prior Publication Data

US 2017/0150033 A1    May 25, 2017

Related U.S. Application Data

(63) Continuation of application No. 14/217,589, filed on Mar. 18, 2014, now abandoned.

(30) Foreign Application Priority Data

Mar. 29, 2013 (JP) ................................. 2013-074543
Feb. 13, 2014 (JP) ................................. 2014-025895

(51) Int. Cl.
    *H04N 5/232* (2006.01)

(52) U.S. Cl.
    CPC ......... *H04N 5/23206* (2013.01); *H04N 5/232* (2013.01)

(58) Field of Classification Search
    CPC ............... H04N 5/23222; H04N 5/232; H04N 5/23206; H04N 1/00

USPC ........................................................ 348/207.1
    See application file for complete search history.

(56) References Cited

U.S. PATENT DOCUMENTS

| 7,823,056 | B1 | 10/2010 | Davey et al. |
| 8,237,953 | B2 | 8/2012 | Watanabe |
| 8,271,665 | B2* | 9/2012 | Chen ....................... H04L 67/02 348/211.3 |
| 8,295,268 | B2* | 10/2012 | Tanaka ............... H04L 29/06027 370/351 |
| 8,495,690 | B2* | 7/2013 | Lee .......................... H04L 67/36 348/211.11 |
| 8,773,553 | B2* | 7/2014 | Torikai ..................... H04N 5/45 348/231.2 |

(Continued)

FOREIGN PATENT DOCUMENTS

| JP | 2008-199531 A | 8/2008 |
| JP | 2011-515725 A | 5/2011 |

OTHER PUBLICATIONS

Japanese Office Action dated Dec. 19, 2017 in corresponding Japanese Patent Application No. 2014-025895 together with English translation, 11 pages.

(Continued)

*Primary Examiner* — Pritham D Prabhakher
(74) *Attorney, Agent, or Firm* — Carter, DeLuca & Farrell LLP

(57) ABSTRACT

An information processing apparatus can hold a bookmark to be used to access a camera through a network. The information processing apparatus acquires a photographed image photographed by the camera from the camera through the network, and then registers the photographed image acquired from the camera in the bookmark.

6 Claims, 16 Drawing Sheets

(56) References Cited

U.S. PATENT DOCUMENTS

| | | |
|---|---|---|
| 8,938,492 B1 | 1/2015 | Kelly |
| 8,976,266 B2* | 3/2015 | Wu .................. H04M 1/72572 |
| | | 348/231.5 |
| 9,152,907 B2 | 10/2015 | Tan |
| 9,251,288 B2 | 2/2016 | Uno et al. |
| 9,277,118 B2* | 3/2016 | Matsui ............... H04N 5/23229 |
| 2002/0122073 A1 | 9/2002 | Abrams et al. |
| 2003/0197785 A1 | 10/2003 | White et al. |
| 2004/0000995 A1* | 1/2004 | Deguchi ............... H04W 64/00 |
| | | 340/539.13 |
| 2004/0064834 A1 | 4/2004 | Kuwata et al. |
| 2005/0021603 A1* | 1/2005 | Yokomitsu ........ H04L 29/12047 |
| | | 709/203 |
| 2006/0279628 A1 | 12/2006 | Fleming |
| 2008/0317456 A1* | 12/2008 | Lee .................. H04N 1/00281 |
| | | 396/321 |
| 2009/0021603 A1* | 1/2009 | Hsieh .................. H04N 5/2351 |
| | | 348/230.1 |
| 2009/0059945 A1* | 3/2009 | Yokomitsu ........ H04L 29/06027 |
| | | 370/419 |
| 2009/0135274 A1* | 5/2009 | Kim ..................... H04N 9/8205 |
| | | 348/231.5 |
| 2011/0221913 A1 | 9/2011 | Nagai et al. |
| 2013/0073687 A1 | 3/2013 | Cok et al. |
| 2013/0100306 A1* | 4/2013 | Bekiares .......... G08B 13/19689 |
| | | 348/211.99 |
| 2013/0147961 A1 | 6/2013 | Gao et al. |
| 2014/0049654 A1* | 2/2014 | Okada ................ H04N 5/23206 |
| | | 348/207.1 |
| 2016/0235234 A1* | 8/2016 | Tubbs ..................... E01C 9/086 |

OTHER PUBLICATIONS

Numara et al., "Development of Position Information Automatic Super System," 65th volume No. 7, pp. 165-167, Jul. 1, 2012 together with English translation, 10 pages.

\* cited by examiner

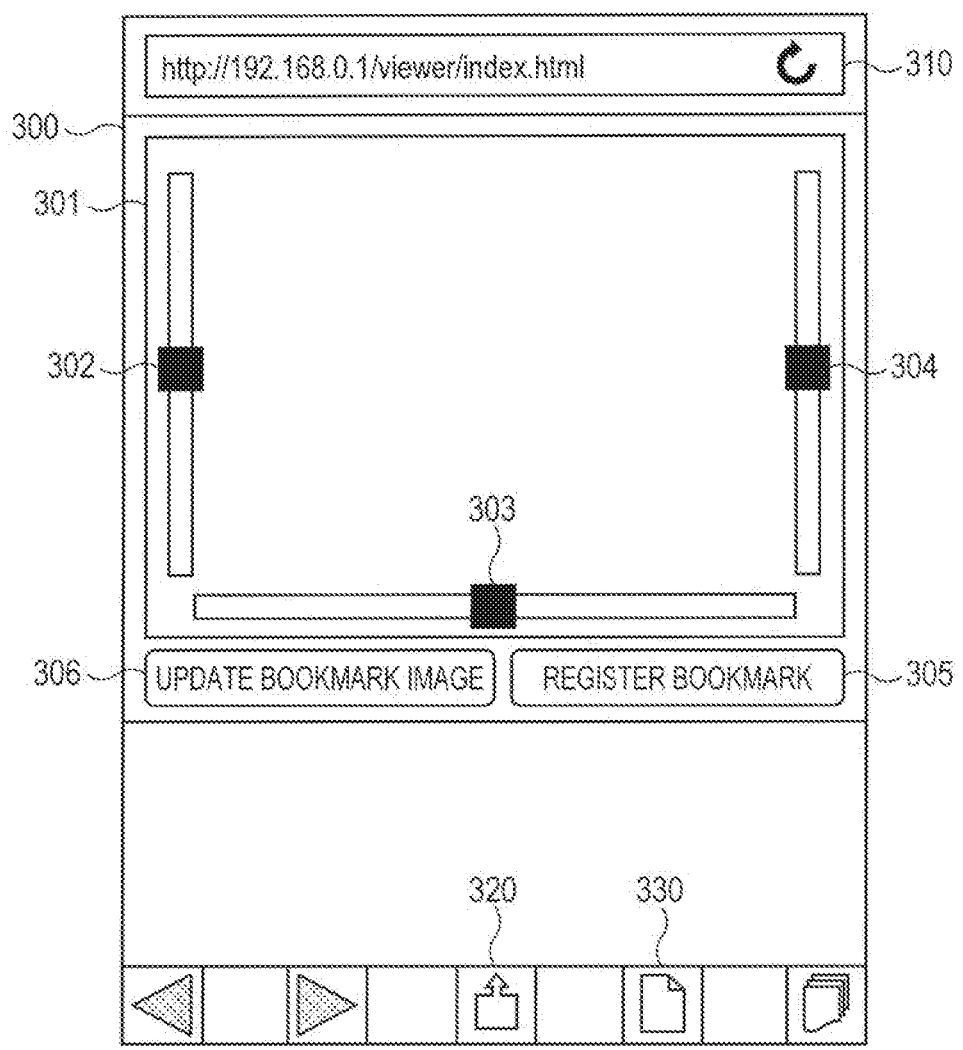

```
GET /-nwhttp-01-/CreateBookmarkImage HTTP/1.1
Accept: */*
Referer: http://192.168.0.1/viewer/index.html
Accept-Language: ja
Accept-Encoding: gzip, deflate
User-Agent: Mozilla/4.0 (compatible; MSIE 7.0; Windows NT 6.1;
Trident/6.0)
Host: 192.168.0.1
Connection: Keep-Alive
```

```
GET /-nwhtip-01-/CreateBookmarkImage?campos=1 HTTP/1.1
Accept: */*
Referer: http://192.168.0.1/viewer/index.html
Accept-Language: ja
Accept-Encoding: gzip, deflate
User-Agent: Mozilla/4.0 (compatible; MSIE 7.0; Windows NT 6.1;
Trident/6.0)
Host: 192.168.0.1
Connection: Keep-Alive
```

FIG. 12

```
GET /-nwhttp-01-
/CreateBookmarkImage?x=60&y=60&v=100&h=100&size=320x240
HTTP/1.1
Accept: */*
Referer: http://192.168.0.1/viewer/index.html
Accept-Language: ja
Accept-Encoding: gzip, deflate
User-Agent: Mozilla/4.0 (compatible; MSIE 7.0; Windows NT 6.1;
Trident/6.0)
Host: 192.168.0.1
Connection: Keep-Alive
```

INFORMATION PROCESSING APPARATUS, NETWORK CAMERA AND PROCESSING SYSTEM

CROSS REFERENCE TO RELATED APPLICATIONS

This application is a continuation of U.S. patent application Ser. No. 14/217,589, filed on Mar. 18, 2014, which claims the benefit of and priority to Japanese Patent Application Nos. 2013-074543, filed on Mar. 29, 2013, and 2014-025895, filed on Feb. 13, 2014, each of which are hereby incorporated by reference in their entireties.

BACKGROUND OF THE INVENTION

Field of the Invention

The present invention relates to an information processing apparatus, a network camera and a processing system.

Description of the Related Art

It has been widely and generally performed to easily acquire URL (Uniform Resource Locator) information by previously adding a name to the URL information and storing them in an information processing apparatus. On that occasion, a previously formed image can be stored together with the URL information in a Web page, and thus the stored image can be displayed together with the name thereof.

For example, Japanese Patent Application Laid-Open No. 2011-515725 discloses a method in which a Web page connected from a URL is associated with the URL and stored as a thumbnail image. By this method, when a name of the Web page is displayed, the corresponding thumbnail image is simultaneously displayed, thereby acquiring the associated URL of the Web page.

However, if it is assumed that different cameras are used at respective URLs connected to Web pages respectively for displaying images from the cameras, an identical image is displayed regarding the respective URLs in the conventional technique of storing the previously formed image in the Web page together with the URL information. Consequently, there is a problem that it is difficult for a user to discriminate from which camera the displayed image has been acquired. Meanwhile, in order to switch an image for each URL, since it is necessary to previously form a different image for each URL, there is a problem that it is troublesome.

Besides, in the above related art disclosed in Japanese Patent Application Laid-Open No. 2011-515725, since the contents of the whole Web page are stored as the thumbnail images, the images other than the image acquired from the camera are stored as the thumbnail images. Therefore, there is a problem that the necessary and important image acquired from the camera is merely displayed small in size.

SUMMARY OF THE INVENTION

The present invention, which has been completed in consideration of the above problems, aims to be able to easily discriminate a bookmark to be used for accessing a camera.

Further, the present invention aims to provide an information processing apparatus which can hold a bookmark to be used to access a camera through a network, and comprises: an acquisition unit configured to acquire a photographed image photographed by the camera, from the camera through the network; and a registration unit configured to register the photographed image acquired from the camera, in the bookmark.

Furthermore, the present invention aims to provide a network camera which comprises: a receiving unit configured to receive, from a request device, a request to photograph an image to be registered in a bookmark; a processing unit configured to process the photographed image for registration in the bookmark; and a transmitting unit configured to transmit, to the request device, the photographed image processed by the processing unit for registering the photographed image in the bookmark.

Furthermore, the present invention aims to provide a system which comprises a network camera and an information processing apparatus, wherein the information processing apparatus further comprises an acquisition unit configured to acquire a photographed image photographed by the network camera, from the network camera through a network, and a registration unit configured to register the photographed image acquired from the network camera, in a bookmark to be used by the information processing apparatus to access the network camera through the network, and the network camera further comprises a transmitting unit configured to transmit the photographed image to the information processing apparatus.

Further features of the present invention will become apparent from the following description of exemplary embodiments with reference to the attached drawings.

BRIEF DESCRIPTION OF THE DRAWINGS

FIG. 3 is a diagram illustrating a screen image of a viewer client according to the first embodiment.

FIG. 12 is a diagram illustrating an example of an HTTP command indicating a bookmark registration request according to the third embodiment.

DESCRIPTION OF THE EMBODIMENTS

Hereinafter, preferred embodiments of the present invention will be described in detail with reference to the accompanying drawings.

A first embodiment is an embodiment in which a camera with a Web server function receives a bookmark registration request from a client, photographs an image in response to the received bookmark registration request, generates a bookmark image by cutting out a partial range from the photographed image, and transmits the generated bookmark image to the client.

A second embodiment is an embodiment in which a position of a camera is changed according to a camera position selected when registration of a bookmark is requested, an image is then photographed in the changed position, and a bookmark image is generated based on the photographed image.

A third embodiment is an embodiment in which a cutout range is displayed on an image when registration of a bookmark is requested.

A fourth embodiment is an embodiment in which a bookmark image is generated inside a client by using an image already received by the client, and registration of the bookmark image is performed.

A fifth embodiment is an embodiment in which a bookmark image is generated, a bookmark name, as well as the generated bookmark image, is acquired based on a position acquired by using a position information acquisition unit connected to a camera, and the generated bookmark image and the acquired bookmark name are registered.

(First Embodiment)

Figure 1:
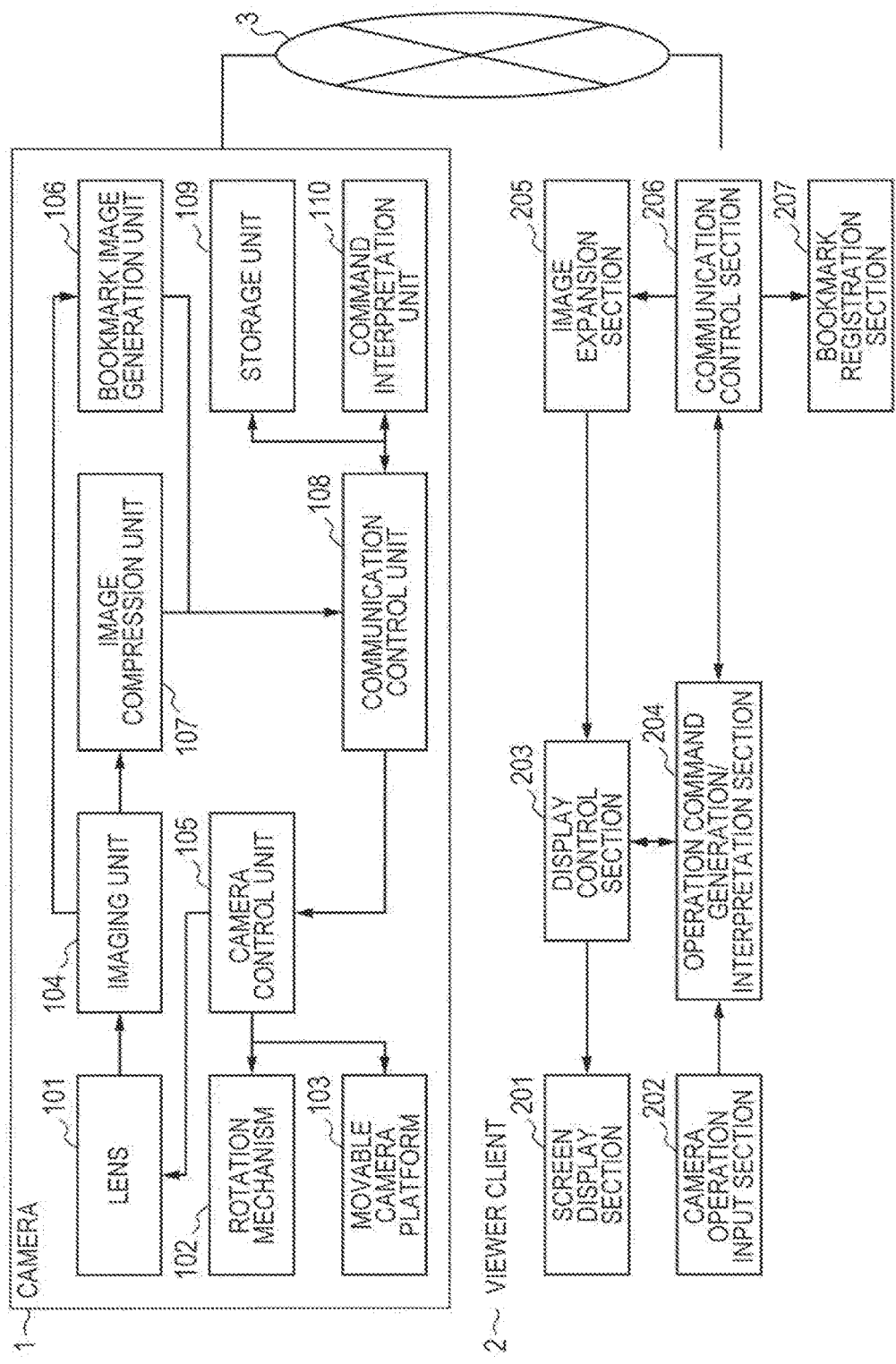
FIG. 1 is a block diagram illustrating an example of a configuration of an information processing system to which a first embodiment of the present invention is applied.

FIG. 1 is a block diagram for describing an example of a configuration of an information processing system in which a camera can be actually controlled from a connected information processing apparatus.

In the present embodiment, the information processing system is configured such that a camera 1 which has a bookmark image generation function, and a viewer client 2 which requests registration of a bookmark to the camera 1 and actually registers the bookmark therein are connected to each other through a network 3.

Although the number of cameras (i.e., network cameras) and the number of viewer clients respectively connected to the network 3 are not specifically limited in the present embodiment, it is assumed that one camera and one viewer network are respectively connected to the network in the present embodiment for simplifying the description. Moreover, any type of network can be used as the network 3, if the relevant network is a digital network such as the Internet, an intranet or the like which has a sufficient band enabling to transmit compressed image signals.

Incidentally, in the present embodiment, it is assumed that an HTTP protocol is used as a protocol for the network, and an IP (Internet Protocol) address is simply called an address in the following description. Besides, it is assumed that an IP address has been allocated to each of the camera 1 and the viewer client 2.

In the camera 1, a communication control unit 108 delivers image data through the network 3 and performs various camera operations, in response to operation commands received from the viewer client 2. First, an imaging unit 104 captures a photographed image (i.e., a moving image and a still image) through a lens 101. Then, when the registration of the bookmark is requested, the photographed image captured by the imaging unit is processed by a bookmark image generation unit 106, and a bookmark image (i.e., an image to be registered with a predetermined URL) is thus generated.

A storage unit 109 holds or stores therein various kinds of setting values or parameters, and further holds or stores therein previously designated camera positions and the like. The lens 101, the imaging unit 104, and a rotation mechanism 102 for performing rotation control are installed or mounted on a movable camera platform 103, and they are controlled by a camera control unit 105.

Then, a command interpretation unit 110 interprets the operation command received by the communication control unit 108, and, after then, the camera control unit 105 performs imaging device control such as panning control, tilting control, zooming control, rotation control and the like for the lens 101, the rotation mechanism 102 and the movable camera platform 103, in accordance with designated control contents.

Incidentally, an image compression unit 107 compresses the digital image captured by the imaging unit 104 through the lens 101 in accordance with a Motion-JPEG (Motion-Joint Photographic Experts Group) method, transfers the compressed digital image to the communication control unit 108, and then transmits the transferred digital image as image data to the network 3. Incidentally, although the Motion-JPEG method is used as the image compression method in the present embodiment, the present invention is not limited to this compression method.

The viewer client 2 is a Web application which operates on a Web browser implemented by an HTML (HyperText Markup Language) format or a JavaScript format. Here, it should be noted that it is possible to download the viewer client 2 from the camera 1 by designating the predetermined URL including the IP address allocated to the relevant camera.

A communication control section 206 receives the photographed image and the previously designated camera position held in the storage unit 109, both delivered from the camera 1. Also, the communication control section receives the results of various camera operations.

A display control section 203 generates a GUI (graphical user interface) on the basis of the photographed image decompressed by an image expansion section 205 and the results of the various camera operations, and causes a screen display section 201 to display the generated GUI.

A camera operation input section 202 receives and accepts various user inputs for camera operations through a mouse, a keyboard and a touch screen, and transfers the accepted user inputs to an operation command generation/interpretation section 204.

The operation command generation/interpretation section 204 generates various camera operation commands for panning, tilting, zooming and rotating the camera, and a bookmark registration request command for requesting the registration of the bookmark, on the basis of GUI operations such as a slider operation, a button operation, mouse clicking on the image and the like.

The various camera operation commands generated by the operation command generation/interpretation section 204 are transmitted to the camera 1 through the communication control section 206. Moreover, the operation command generation/interpretation section 204 interprets the camera operation result received from the camera 1, and reflects the interpreted result on the GUI generated by the display control section 203.

Figure 2B:
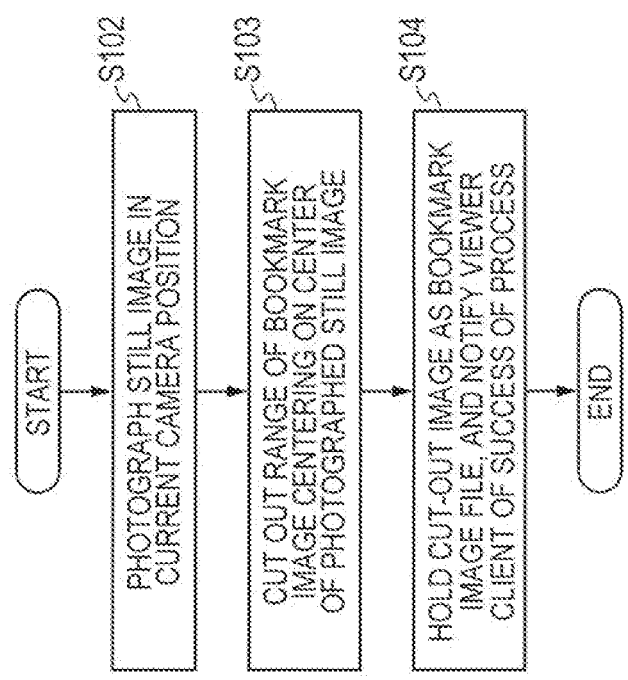
FIGS. 2A and 2B are flow charts for describing an example of a bookmark registration process according to the first embodiment.
Figure 2A:
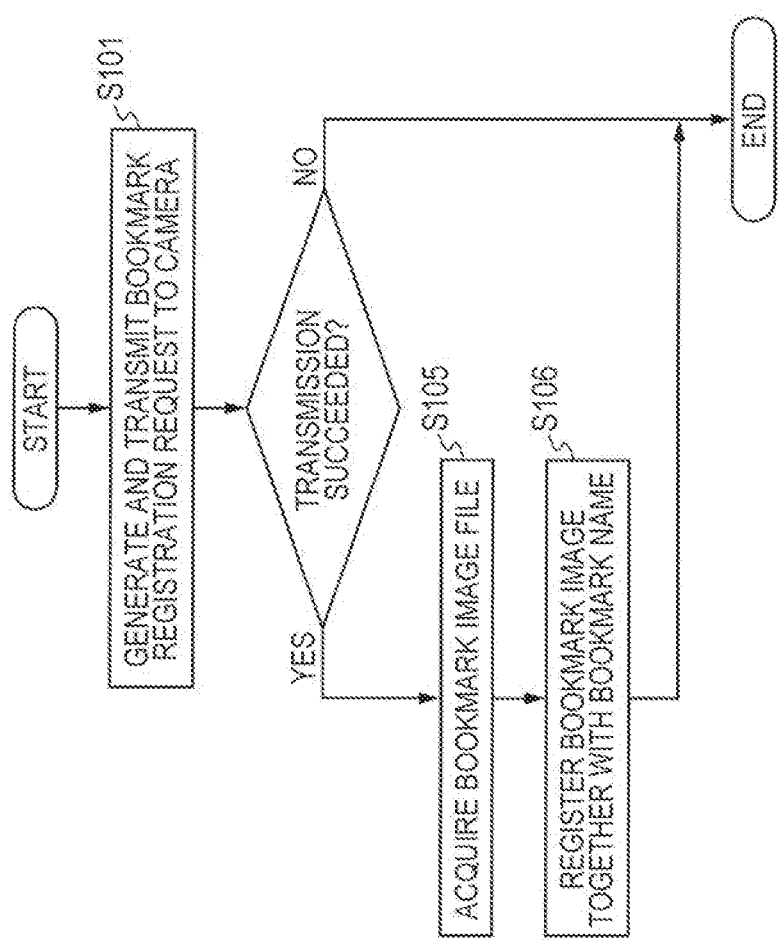

FIGS. 2A and 2B are flow charts for describing an example of a process to be performed in the information processing system which includes the camera 1 which received the request of the registration of the bookmark (hereinafter, simply called the bookmark registration request) and the viewer client 2. Moreover, FIG. 3 is a diagram illustrating a screen image of the viewer client 2 according to the present embodiment.

A viewer client screen 300 includes a tilting slider 302, a panning slider 303, a zooming slider 304, a bookmark registration button 305 and a bookmark image update button 306, and the viewer client screen is displayed on the Web page display section of the Web browser. Besides, an address bar 310, a bookmark registration menu 320 and a bookmark list display button 330 are displayed on the Web browser.

Figures 4, 5:
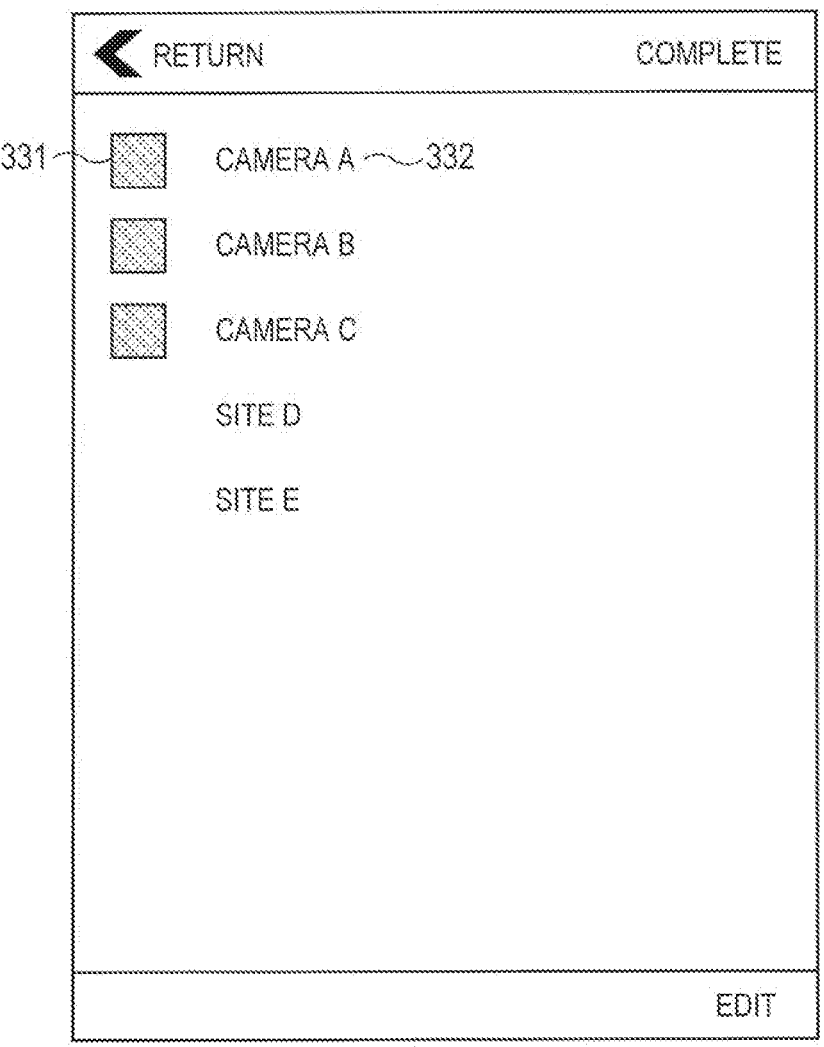
FIG. 4 is a diagram illustrating an example of an HTTP (HyperText Transfer Protocol) command indicating a bookmark registration request according to the first embodiment.
FIG. 5 is a diagram illustrating a screen displaying a bookmark list.

The flow chart illustrated in FIG. 2A corresponds to the process which is performed by the viewer client 2, and the flow chart illustrated in FIG. 2B corresponds to the process which is performed by the camera 1. When the bookmark registration button 305 is pressed on the viewer client 2, in S101, the bookmark registration request is first generated and transmitted to the camera 1. The bookmark registration request is transmitted according to a GET command of the HTTP which includes a command name indicating the bookmark registration request as illustrated in FIG. 4.

In the camera 1, the bookmark registration request transmitted from the viewer client 2 in S101 is received by the communication control unit 108.

Then, it is determined by the command interpretation unit 110 whether or not the received command is the bookmark registration request. If it is determined that the received command is the bookmark registration request, then, in S102, the photographing is started in the current camera position maintained as it is, and the still image is captured and generated by the imaging unit 104 through the lens 101. Here, in a case where the imaging unit 104 steadily continues to photograph the still image, it may be possible to extract the latest still image already photographed.

Next, in S103, the bookmark image generation unit 106 calculates the center position of the image on the basis of the photographed result of the still image generated by the imaging unit 104, and cuts out from the image a rectangular range which has the same height and width and has the center identical with the calculated center position.

Then, in S104, a bookmark image file which has a predetermined size and a predetermined file format is generated from the cut-out partial image, and the generated bookmark image file is held in the storage unit 109 through the communication control unit 108. Moreover, a success of the bookmark registration request is notified to the viewer client 2 through the communication control unit 108 and the network 3.

Then, in S105, the viewer client 2 to which the success of the bookmark registration request was notified receives and acquires, from the camera 1, the bookmark image file held in the storage unit 109. Then, in S106, the received bookmark image file is added and registered, together with a bookmark name indicating the name of the camera, to the bookmark list of a bookmark registration section 207 of the viewer client 2 (S106). The bookmark list is displayed as illustrated in FIG. 5 by the pressing of the bookmark list display button 330, such that a bookmark image 331 and a bookmark name 332 are associated with each other.

Here, it is possible to register the bookmark to which the bookmark image has been added, by not only pressing the bookmark registration button 305 but also pressing the bookmark image update button 306 and then selecting the bookmark registration menu 320. More specifically, if the bookmark image update button 306 is pressed, the steps S101 and S105 in the flow chart of FIG. 2A are performed, and, if the bookmark registration menu 320 is selected, the step S106 is performed.

Figure 6:
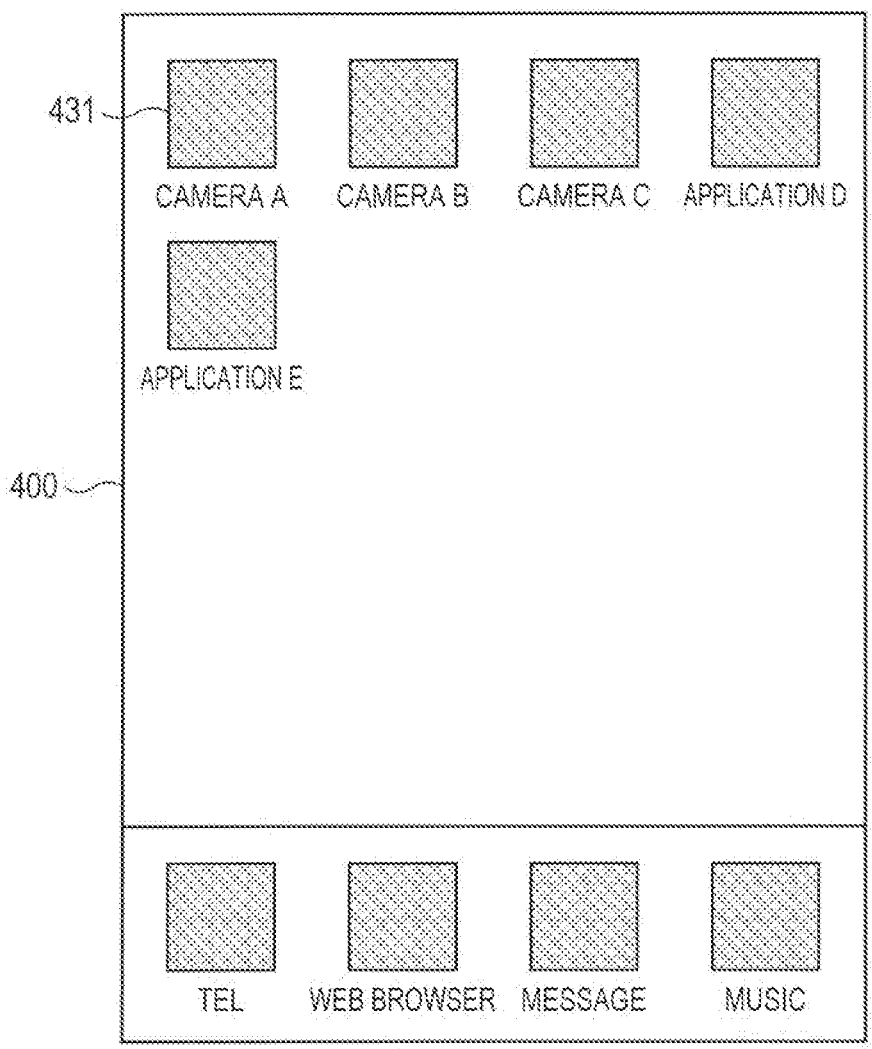
FIG. 6 is a diagram illustrating a desktop screen image on which desktop shortcuts are arranged as bookmarks.

Further, in the case where the bookmark registration menu 320 is pressed, it is possible to select a desktop of a terminal as a bookmark registration destination, in addition to the bookmark list illustrated in FIG. 5. In the case where the desktop of the terminal is selected as the bookmark registration destination, the bookmark image is used as an icon 431 of a desktop shortcut to be displayed on a desktop 400 of the terminal, as illustrated in FIG. 6.

Incidentally, the bookmark image file is recognized as the bookmark image file if it is stored in the position of the same path as that of the viewer download source with the predetermined file name such as "favicon.ico". However, according to a Web browser to be used, it is possible to receive bookmark image data provided in a text form by the "Base64" scheme without a file form, and use the received bookmark image data for the registration of the bookmark. Therefore, it may be possible to change over the bookmark image registration process by the JavaScript of the viewer client 2 according to the Web browser to be used.

(Second Embodiment)

Figure 7:
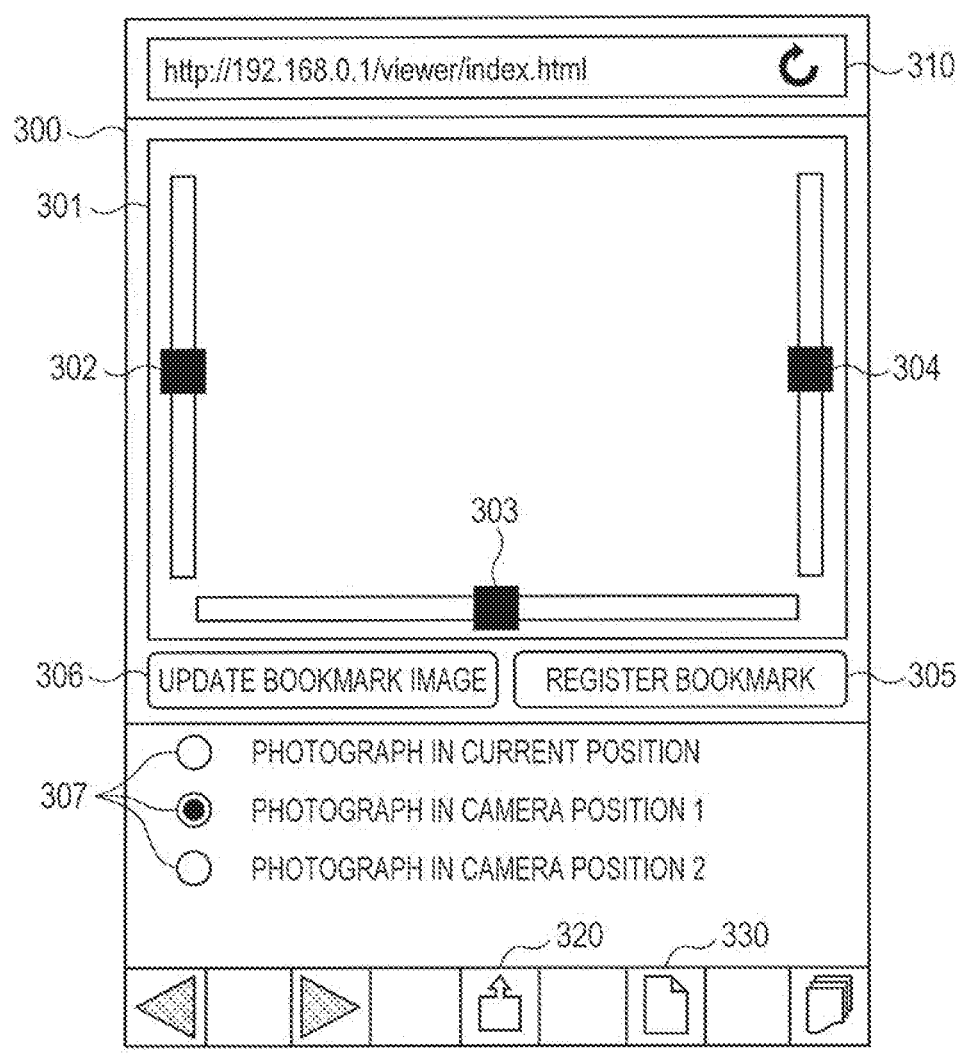
FIG. 7 is a diagram illustrating a screen image of a viewer client to which a second embodiment is applied.

FIG. 7 is a diagram illustrating a screen image of a viewer client 2 according to the second embodiment of the present invention, in which, when registration of a bookmark is requested, a camera position is changed and then photographing is performed. In the present embodiment, photographing position selection radio buttons 307 are added to a screen image corresponding to the screen image of the first embodiment illustrated in FIG. 3.

Figures 8, 9:
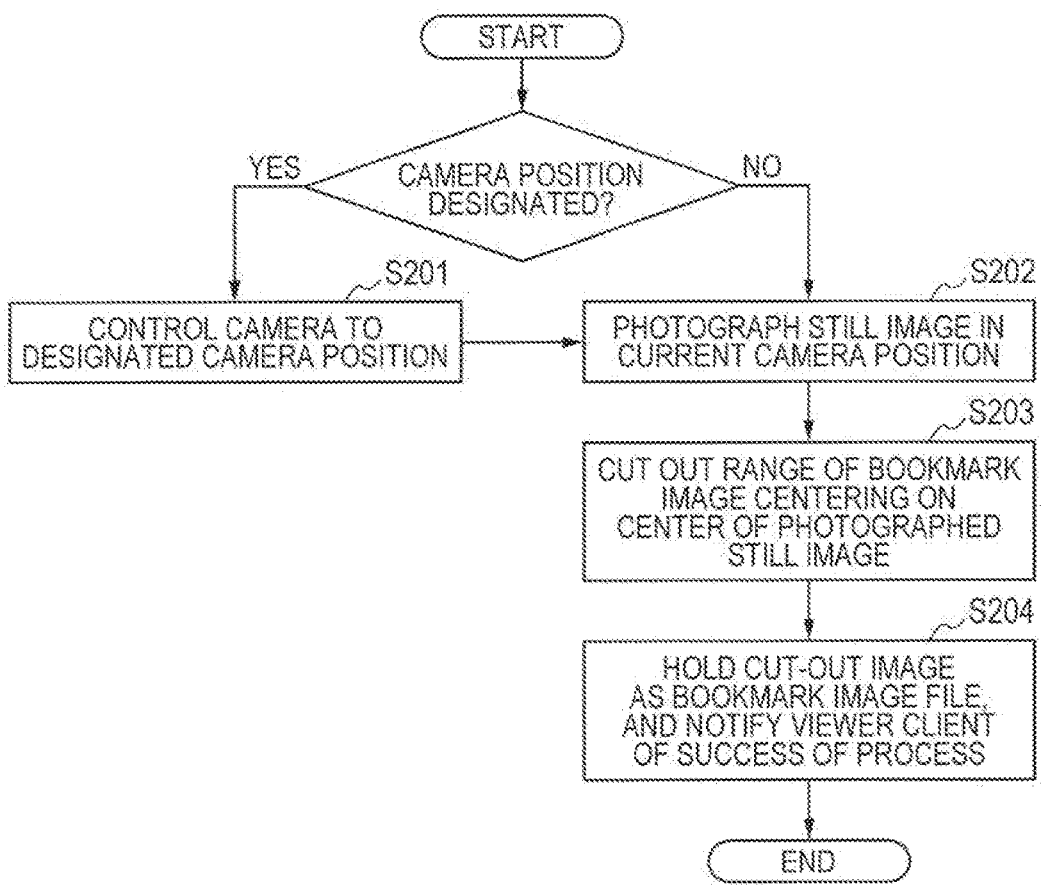
FIG. 8 is a diagram illustrating an example of an HTTP command indicating a bookmark registration request according to the second embodiment.
FIG. 9 is a flow chart for describing an example of a bookmark image generation process on the side of a camera, according to the second embodiment.

More specifically, if a bookmark registration button 305 is pressed in the state that "PHOTOGRAPH IN CAMERA POSITION 1" has been selected by the photographing position selection radio button 307, a bookmark registration request command illustrated in FIG. 8 is generated by an operation command generation/interpretation section 204, and the generated command is transmitted to a camera 1.

When the bookmark registration request command illustrated in FIG. 8 is received, the camera 1 controls the photographing direction to the camera position 1, photographs an image, generates a bookmark image based on the photographed image, and transmits the generated bookmark image to the viewer client. Then, when the bookmark image transmitted from the camera 1 is received, the viewer client 2 registers the received bookmark image in the list of a bookmark registration section 207.

Here, the bookmark registration request command illustrated in FIG. 8 is provided by adding a query string for designating the camera position 1 to a bookmark registration request command corresponding to the bookmark registration request command of the first embodiment illustrated in FIG. 4. In the present embodiment, designation of the position of an imaging device is selected by the photographing position selection radio buttons 307. More specifically, it is selected whether to perform the photographing in the current position or to perform the photographing after controlling the camera to change its position to the camera position previously registered therein.

FIG. 9 is a flow chart for describing an example of the process which is performed on the side of the camera 1 in an information processing system which includes the camera 1 which received the bookmark registration request and the viewer client 2, in the case where, when the registration of the bookmark is requested, the camera position is changed and then the photographing is performed. Here, since the flow chart indicating the process which is performed on the side of the viewer client 2 is common to the flow chart illustrated in FIG. 2A, the description thereof will be omitted. In a case where it has been selected to perform the photographing in the camera position 1 or 2 by the photographing position selection radio button 307, the camera 1 transmits the bookmark registration request command to which the query string for designating the selected camera position has been added.

In the camera 1, when the bookmark registration request transmitted from the viewer client 2 in S101 is received by a communication control unit 108, it is determined by a command interpretation unit 110 whether or not the received command is the bookmark registration request. If it is determined that the received command is the bookmark registration request, it is further determined by the command interpretation unit 110 whether or not the designation of the camera position is included in the command. If it is determined that the designation of the camera position is included in the command, then, in S201, the camera position is controlled to the camera position designated by a camera control unit 105. After the controlling of the camera position was completed in S201, or, if the designation of the camera position is not included in the bookmark registration request, processes in S202 to S204 respectively same as those in S102 to S104 in the first embodiment are sequentially performed. Incidentally, the block diagram for describing the present embodiment is the same as that for describing the first embodiment illustrated in FIG. 1.

(Third Embodiment)

Figure 10:
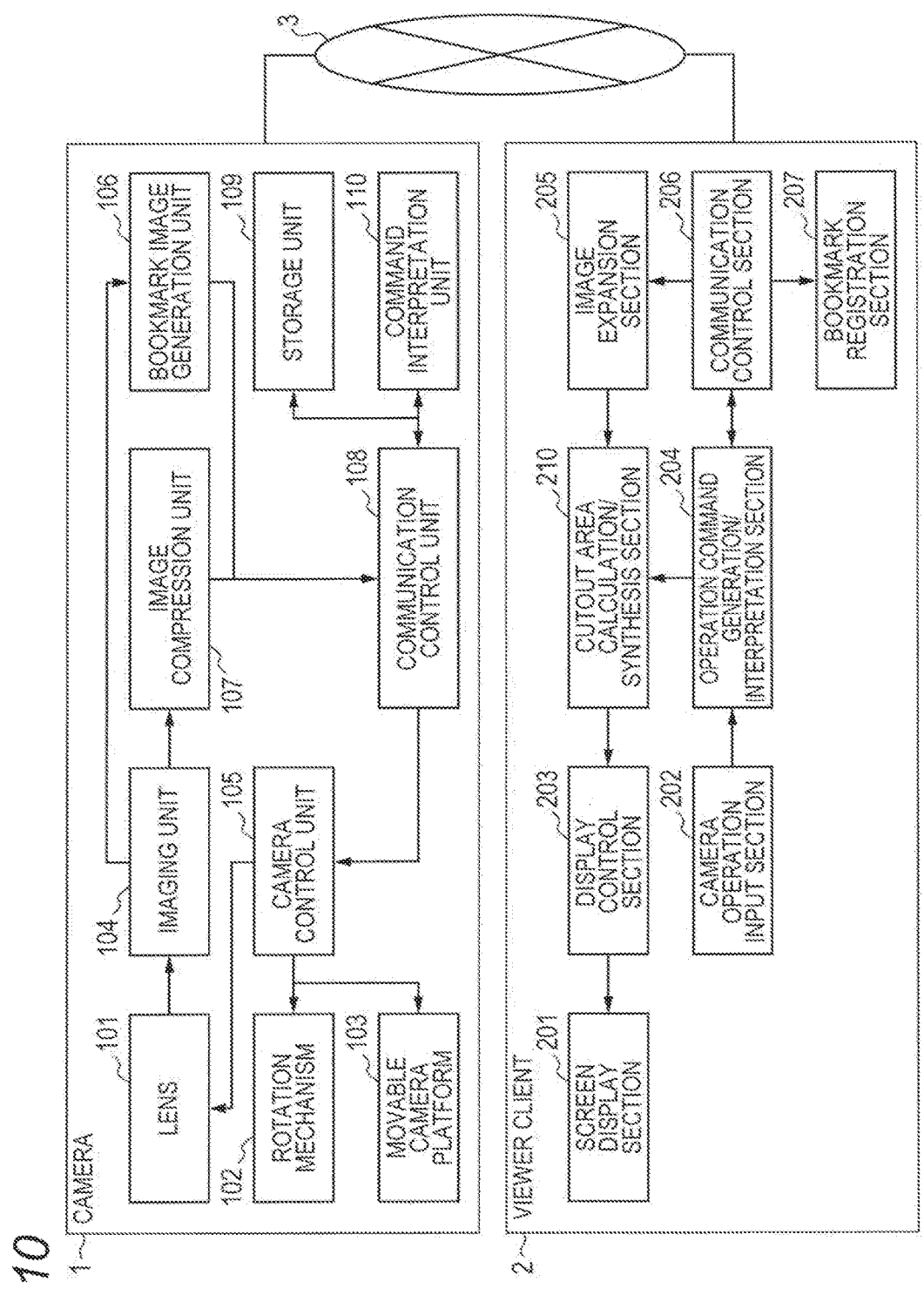
FIG. 10 is a block diagram illustrating an example of a configuration of an information processing system to which a third embodiment of the present invention is applied.

FIG. 10 is a block diagram illustrating an information processing system to which a bookmark registration method to be used in a case where a cutout range is displayed on a screen display section 201 of a viewer client 2 when registration of a bookmark is requested is applied. Basically, the configuration of the information processing system in the present embodiment is substantially the same as that in the first embodiment illustrated in FIG. 1. However, a cutout area calculation/synthesis section 210 is added to the viewer client 2 in the information processing system according to the present embodiment.

Figure 11:
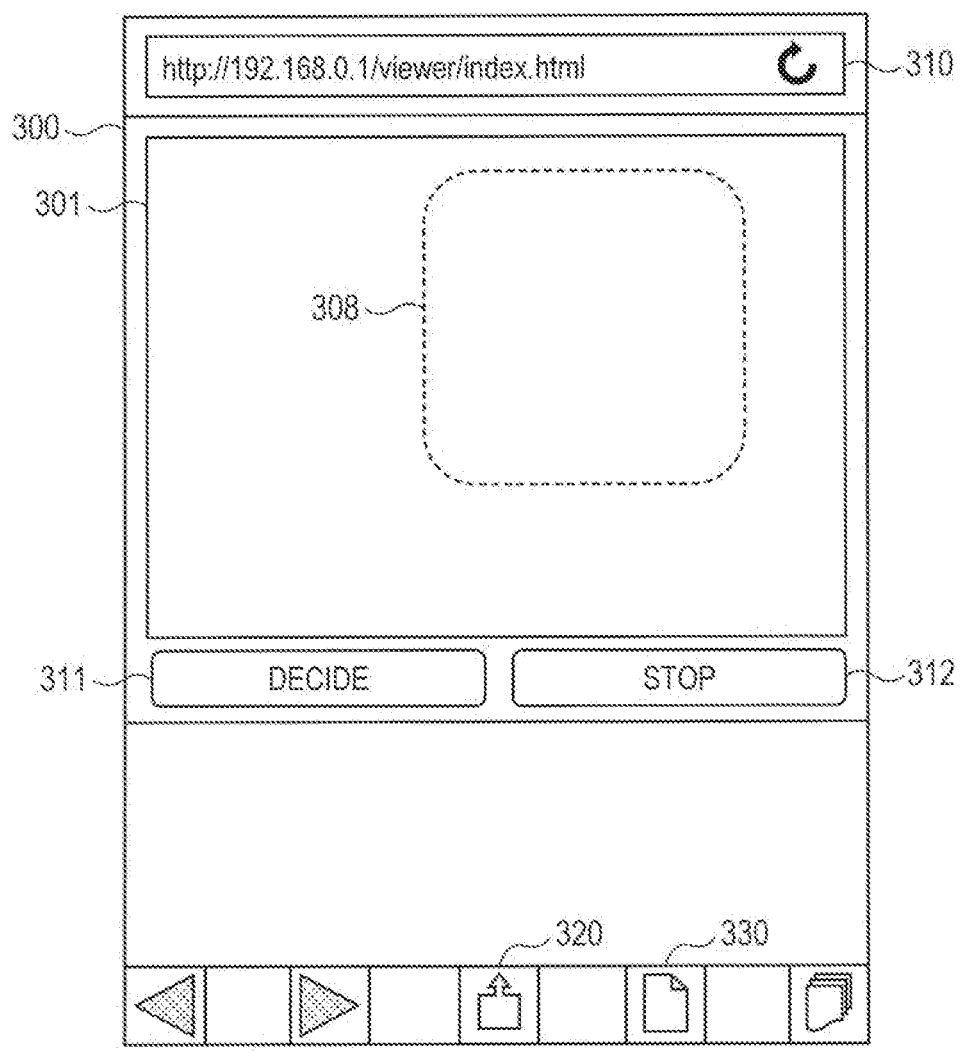
FIG. 11 is a diagram illustrating a screen image of a viewer client according to the third embodiment.

FIG. 11 is a diagram illustrating a screen image of the screen display section 201 to which the bookmark registration method to be used in the case where the cutout range is displayed on the image display of the viewer client when the registration of the bookmark is requested is applied.

If the bookmark registration button 305 or the bookmark image update button 306 is pressed by a user in the screen state illustrated in FIG. 3, an operation mode is changed from a camera operation mode to a bookmark image cutout mode, and the screen illustrated in FIG. 11 is displayed. Here, a bookmark image cutout frame 308, a decision button 311 and a stop button 312 are displayed on a screen display section 301 in the bookmark image cutout mode. More specifically, the bookmark image cutout frame 308 is synthesized onto an image received from a camera 1, by the cutout area calculation/synthesis section 210. Incidentally, the bookmark image cutout frame 308 can be moved by a screen tapping operation and/or a screen swiping operation input through a camera operation input section 202, or the size of the bookmark image cutout frame 308 can be changed by a pinch-in operation and/or a pinch-out operation input through the camera operation input section 202.

If the bookmark image cutout frame 308 is set at an appropriate position and then the decision button 311 is pressed, a bookmark registration request command illustrated in FIG. 12 is generated by an operation command generation/interpretation section 204, and the generated bookmark registration request command is transmitted to the camera 1. Here, the bookmark registration request command is provided by adding a query string for designating the position (x, y) and the size (v, h) of the bookmark image cutout frame 308 on the image and the size of a cutout-source still image to a bookmark registration request command corresponding to the bookmark registration request command of the first embodiment illustrated in FIG. 4. If the stop button 312 is pressed, the operation mode is changed from the bookmark image cutout mode to the camera operation mode, and the screen is returned to the screen state illustrated in FIG. 3.

Figure 13:
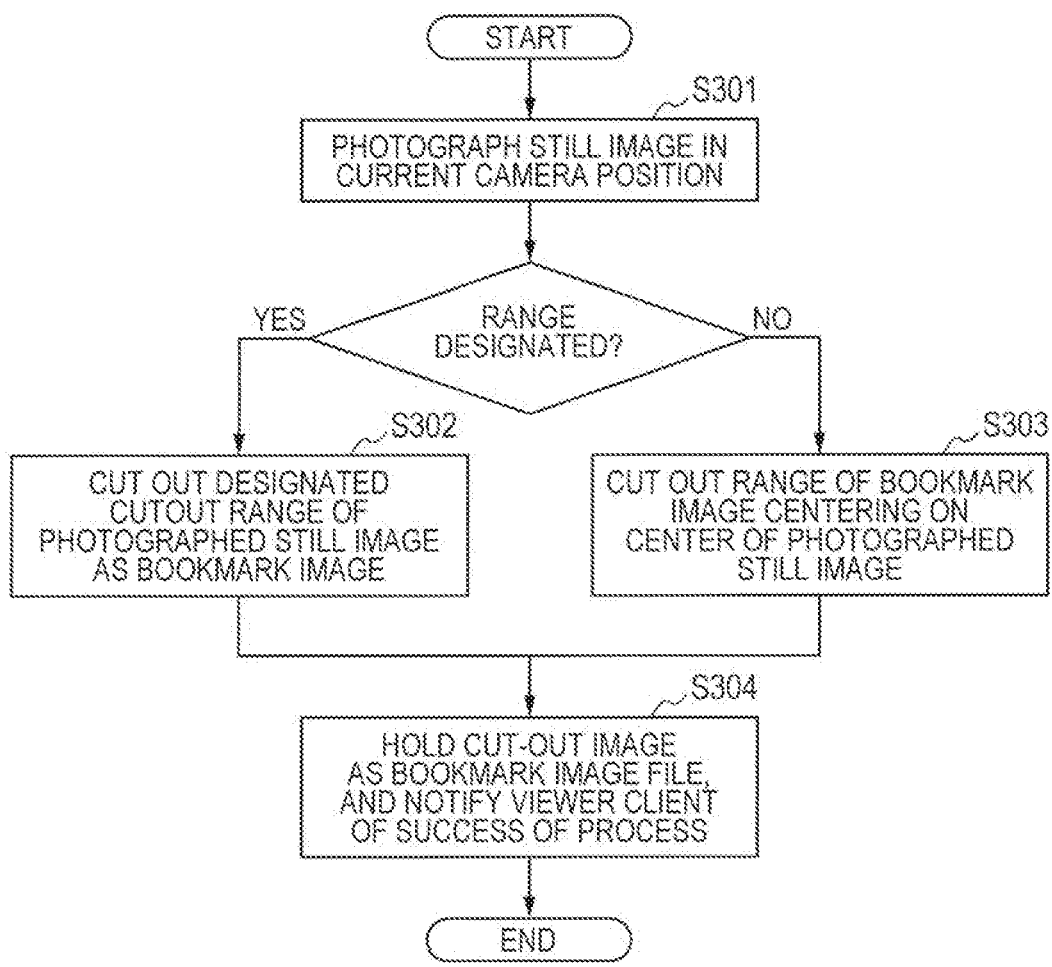
FIG. 13 is a flow chart for describing an example of a bookmark image generation process on the side of a camera, according to the third embodiment.

FIG. 13 is a flow chart for describing an example of the process which is performed on the side of the camera 1 in the information processing system which includes the camera and the viewer client 2 to which the bookmark registration method to be used in the case where the cutout range is displayed on the screen display section 201 of the viewer client 2 when the registration of the bookmark is requested is applied. Here, since the flow chart indicating the process which is performed on the side of the viewer client 2 is common to the flow chart illustrated in FIG. 2A, the description thereof will be omitted. The camera 1 transmits the bookmark registration request command to which the query string for designating the bookmark image cutout frame 308 has been added.

In the camera 1, if the bookmark registration request transmitted from the viewer client 2 in S101 is received by a communication control unit 108, it is determined by a command interpretation unit 110 whether or not the received command is the bookmark registration request. If it is determined that the received command is the bookmark registration request, then a still image is photographed in S301 in the current camera position maintained as it is. Next, it is determined by the command interpretation unit 110 whether or not designation of the cutout range is included in the command. Then, if it is determined that the designation of the cutout range is included in the command, the designated cutout range is cut out as the bookmark image from the still image in S302. Incidentally, the process in S303 to be performed in the case where the designation of the cutout range is not included in the command is the same as the process in S103, and the process in S304 to be performed after the processes in S302 and S303 were completed is the same as that in S104.

(Fourth Embodiment)

Figure 14:
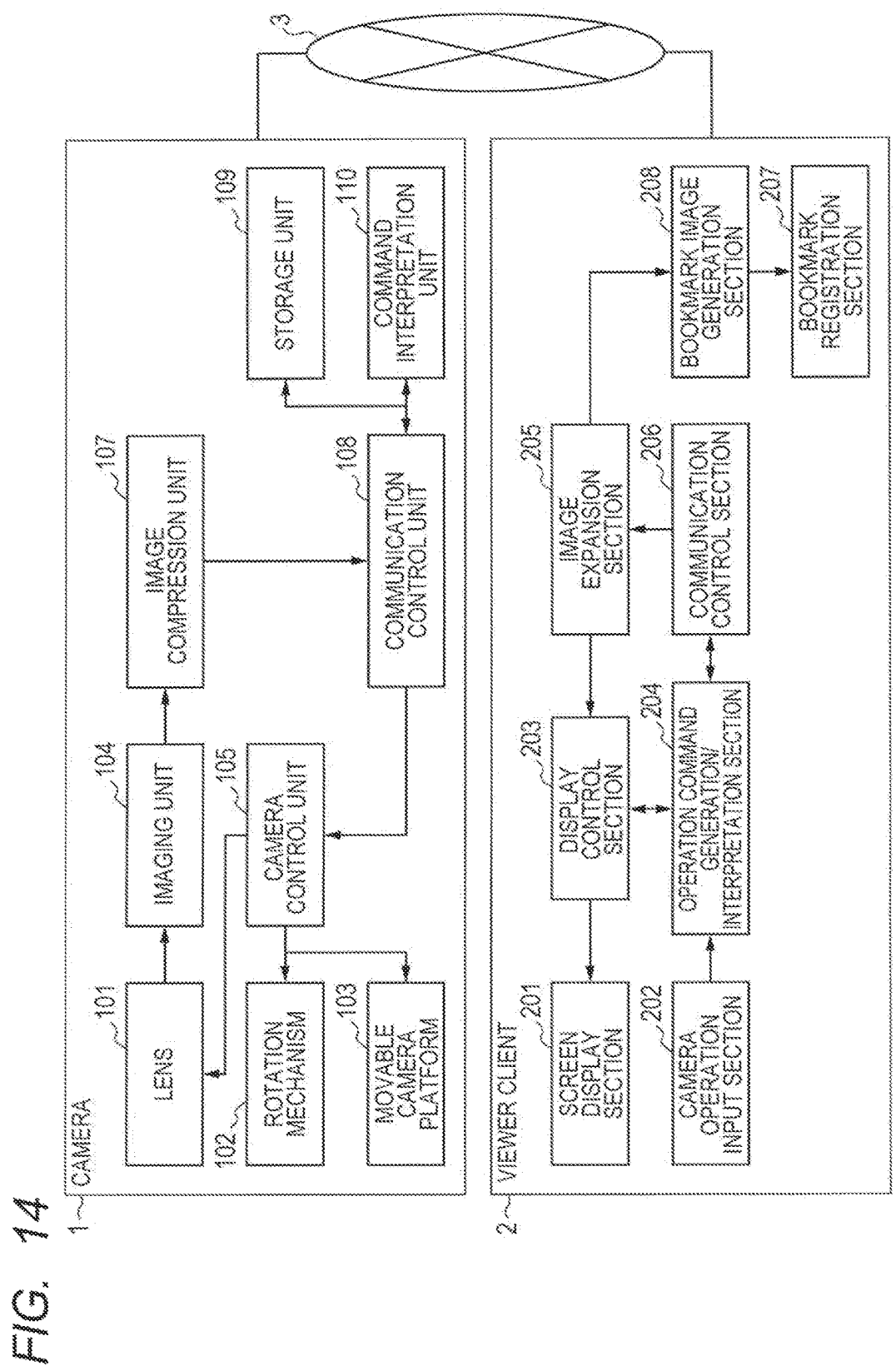
FIG. 14 is a block diagram illustrating an example of a configuration of an information processing system to which a fourth embodiment of the present invention is applied.

FIG. 14 is a block diagram illustrating an information processing system in which a viewer client 2 is provided as a native application implemented by a C language or a C++ language and a bookmark image is generated on the side of the viewer client.

Figure 15:
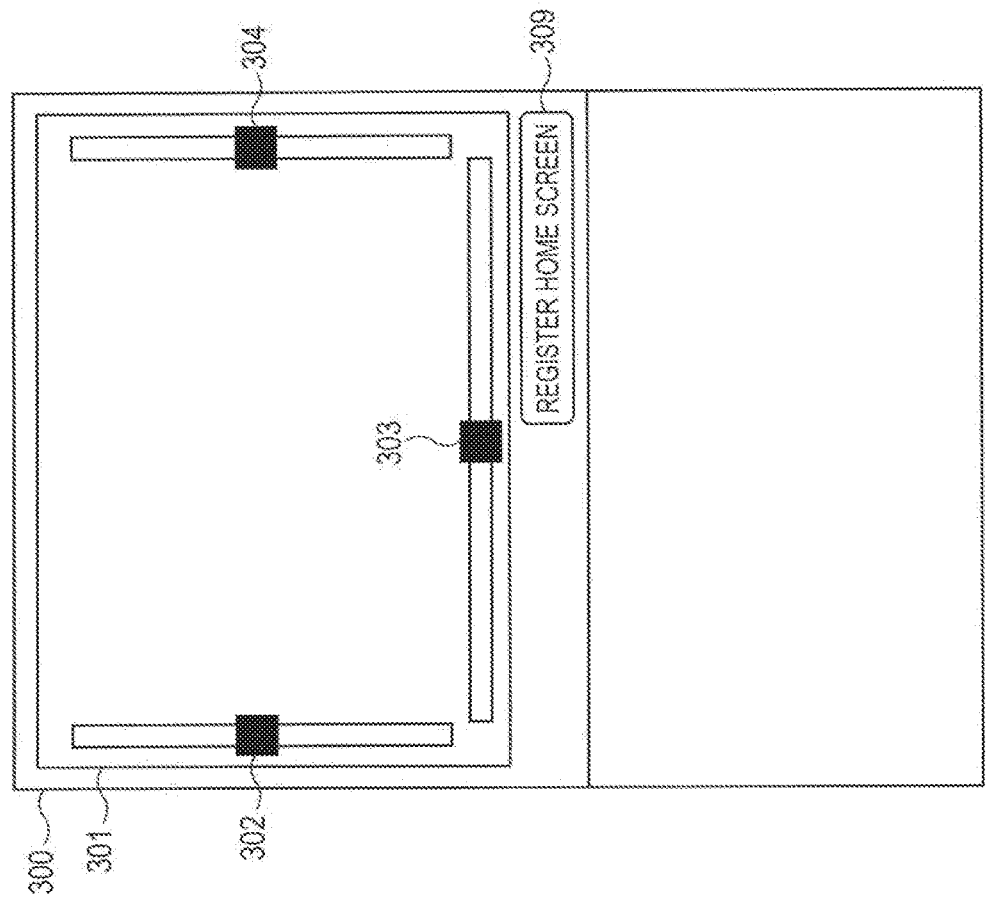
FIGS. 15A and 15B are diagrams illustrating a screen image of a viewer client according to the fourth embodiment.

FIGS. 15A and 15B are diagrams illustrating a screen image in the case where the viewer client 2 is provided as the native application.

In the case where the viewer client 2 is provided as the native application, a connection information dialog box 340 is first displayed. Then, if a camera IP address, a port number, a user name and a password are input, the viewer client is connected to a camera 1, and the screen illustrated in FIG. 15B is displayed. Here, the basic configuration of the displayed screen is the same as that in the case where the viewer client is the Web application as illustrated in FIG. 3. However, since the displayed screen does not operate on the browser, an address bar 310, a bookmark registration menu 320 and a bookmark list display button 330 which are included in the Web browser are not displayed here. Moreover, since the native application does not have a bookmark list unlike the Web browser, a home screen registration button 309 is displayed instead of a bookmark registration button 305.

Figure 16:
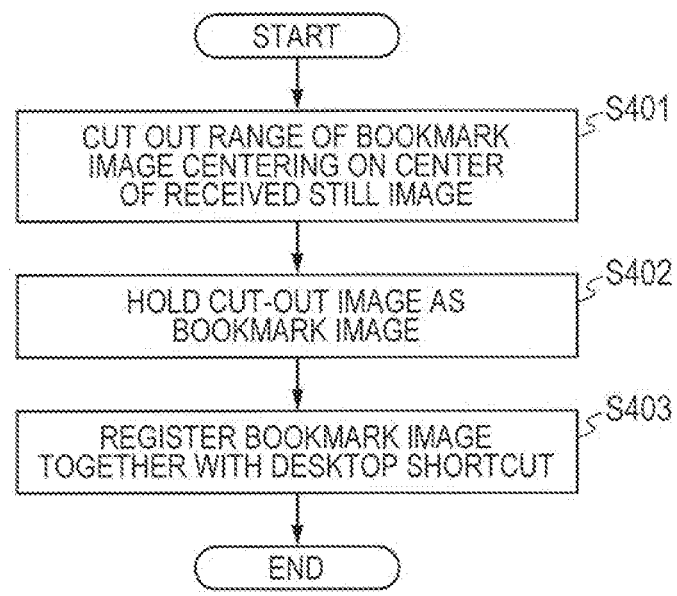
FIG. 16 is a flow chart for describing an example of a bookmark registration process according to the fourth embodiment.

FIG. 16 is a flow chart for describing an example of a desktop shortcut registration process to be performed in the viewer client 2 when the home screen registration button 309 is pressed. Here, since the side of the camera 1 does not perform any specific process when a desktop shortcut is registered in the native application, the description thereof will be omitted.

If the home screen registration button 309 is pressed, in S401, the bookmark image generation section 208 first calculates the center position of a latest image decompressed by an image expansion section 205, and cuts out from the image a rectangular range which has the same height and width and has the center identical with the calculated center position. Next, the cut-out image is held as the bookmark image in S402. Then, in S403, a bookmark registration section 207 stores the desktop shortcut together with a separately set bookmark name.

As well as the Web application in the first embodiment of FIG. 6, the desktop shortcut is registered on a desktop screen. In the case where the viewer client 2 is the native application, the native application to be started and parameters to be given thereto are registered as a shortcut name. Incidentally, in the case where the viewer client is the Web application, the URL of the HTTP is registered as the shortcut name. In the present embodiment, the shortcut name is registered in the form of <identification name inherent in native application>://<user name>:<password>@IP address(:<port number>). For example, nwviewer://root:******@192.168.0.1 is given.

If the given desktop shortcut is pressed by a user, the connection information dialog box illustrated in FIG. 15A is omitted, the camera 1 is directly accessed, and the screen illustrated in FIG. 15B is displayed. Incidentally, the data to be input on the screen illustrated in FIG. 15A is registered on the desktop shortcut.

Incidentally, the shortcut name to be registered to the desktop shortcut is not limited to the above form.

(Fifth Embodiment)

Figure 17:
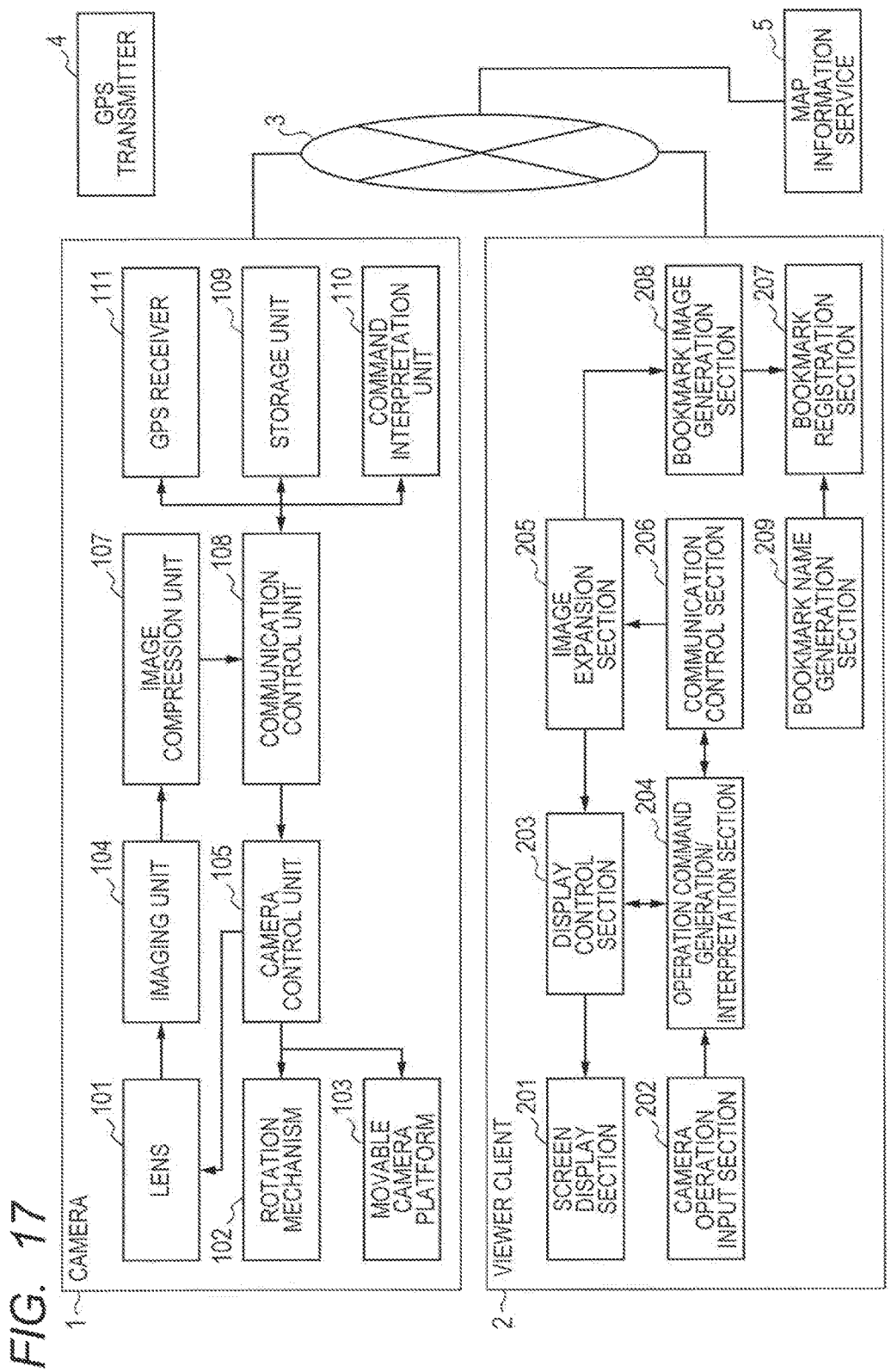
FIG. 17 is a block diagram illustrating an example of a configuration of an information processing system to which a fifth embodiment of the present invention is applied.

FIG. 17 is a block diagram illustrating an example of a configuration of an information processing system to which a bookmark registration method which is performed in a case where a name is acquired based on a position acquired using a position information acquisition unit connected to a camera and the acquired name is delivered together with a bookmark image to a client is applied. Since a viewer client 2 in the information processing system of the present embodiment is assumed as a native application, the configuration thereof is substantially the same as that in the block diagram of FIG. 14. However, a GPS (global positioning system) receiver 111 is added in a camera 1, and a GPS transmitter 4 and a map information service 5 are added through a network 3.

The GPS receiver 111 measures position information (latitude and longitude) of the camera 1 by receiving a radio wave from the GPS transmitter 4. Moreover, the name of the position is acquired based on the position information by transmitting the position information measured by the GPS receiver 111 to the map information service 5 with use of a communication control unit 108 through the network 3. The acquired name is delivered together with an image photographed by an imaging unit 104 to the viewer client 2 through the network 3.

Figure 18:
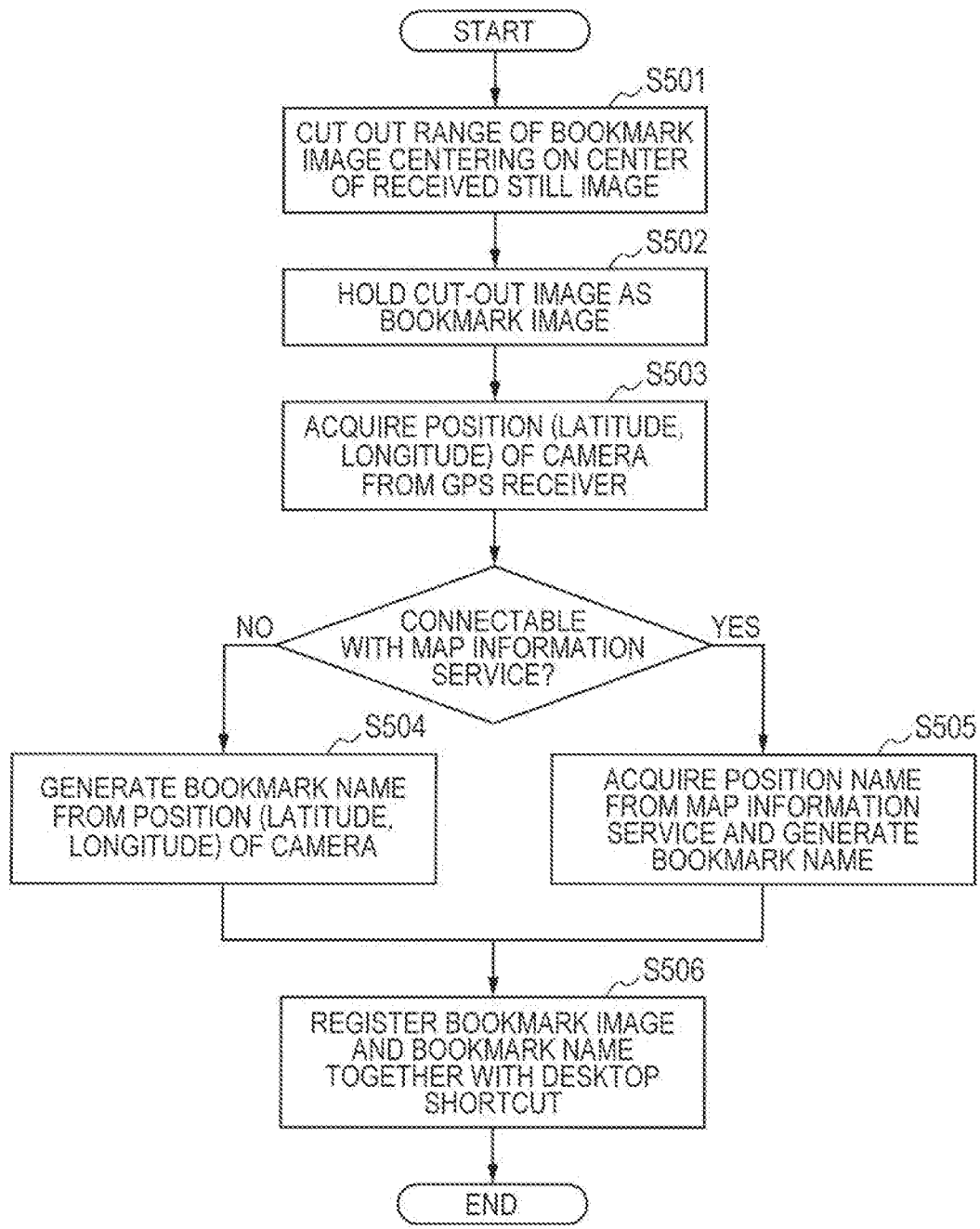
FIG. 18 is a flow chart for describing an example of a bookmark registration process according to the fifth embodiment.

FIG. 18 is a flow chart for describing an example of a desktop shortcut registration process which is performed in the viewer client 2 in the information processing system of the present embodiment which consists of the camera 1 and the viewer client 2. Incidentally, a screen image of the viewer client 2 is the same as that in the fourth embodiment illustrated in FIGS. 15A and 15B.

If a home screen registration button 309 is pressed, in S501, a bookmark image generation section 208 first calculates the center position of a latest received image decompressed by an image expansion section 205, and cuts out from the image a rectangular range which has the same height and width and has the center identical with the calculated center position. Next, the cut-out image is held as the bookmark image in S502.

Further, in S503, the position information (latitude and longitude) of the camera 1 is acquired from the camera 1. The camera 1 causes the GPS receiver 111 to receive the radio wave transmitted from the GPS transmitter 4, measures the position information (latitude and longitude) of the camera 1, and notifies the viewer client 2 of the measured position information. Here, in a case where the camera cannot be connected to the map information service 5 due to a problem of a configuration on the side of the viewer client 2 and/or a problem of communication on the network 3, in S504, the position information (latitude and longitude) of the camera 1 is directly set as the bookmark name by a bookmark name generation section 209. On the other hand, in a case where the camera can be connected to the map information service 5, in S505, the position information (latitude and longitude) of the camera 1 is transmitted to the map information service 5. Thus, a position name which is a landmark name or the like is acquired, and the acquired position name is set as the bookmark name by the bookmark name generation section 209.

In S506, the acquired bookmark image and the acquired position name are registered together with the desktop shortcut by a bookmark registration section 207.

As above, the preferred embodiments of the present invention have been described. However, the present invention is not limited to these embodiments, and various deformations and modifications can be achieved within the scope of the present invention.

(Other Embodiments)

The present invention can be achieved by performing the following process in which software (a computer program) for achieving the functions of the above embodiments is supplied to a system or an apparatus through a network or various computer-readable storage media, and a computer (or a CPU, an MPU, etc.) of the system or the apparatus reads out and executes the computer program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A photographing processing apparatus which is connected to a network, comprising:
    a global positioning system (GPS) receiving unit;
    a processor;
    a memory storing instructions, which when executed by the processor, causes the photographing processing apparatus to:
        acquire position information from a position information providing device via the network; and
        transmit the position information acquired, via the network, wherein a receiving device which received the position information transmitted sets a name of a shortcut for accessing the photographing processing apparatus based on the position information transmitted,
    wherein when failing to acquire the position information from the position information providing device, the execution of the instructions by the process further causes the photographing processing apparatus to transmit second position information acquired from the GPS receiving unit.

2. The photographing processing apparatus according to claim 1, further comprising a global positioning system (GPS) receiving unit, wherein the execution of the instructions by the processor further causes the photographing processing apparatus to acquire the position information from the GPS receiving unit.

3. A position information transmitting method in a photographing processing apparatus connected to a network, the method comprising:
    acquiring position information from a position information providing device via network;
    transmitting the acquired position information via the network, wherein a receiving device which received the transmitted position information sets a name of a shortcut for accessing the photographing processing apparatus, based on the transmitted position information; and
    when failing to acquire the position information from the position information providing device, transmitting second position information acquired from a global positioning system (GPS) receiving unit.

4. The position information transmitting method according to claim 3, further comprising acquiring the position information from the GPS receiving unit.

5. A non-transitory computer-readable storage medium which is used to store a computer program to be executed by a computer connected to a network, wherein the computer program is configured to:
    photograph an image;
    transmit the photographed image to a receiving device via the network;
    acquire position information from a position information providing device via the network;
    transmit the acquired position information to the receiving device via the network, wherein the receiving device which received the transmitted position information sets a name of a shortcut for accessing the computer, based on the transmitted position information; and
    when failing to acquire the position information from the position information providing device, transmitting second position information acquired from a global position system (GPS) receiving unit.

6. The non-transitory computer-readable storage medium according to claim 5, wherein the computer program is further configured to acquire the position information from the GPS receiving unit.

* * * * *